United States Patent
Neil et al.

(10) Patent No.: US 6,979,421 B2
(45) Date of Patent: Dec. 27, 2005

(54) METHOD OF MAKING A CERAMIC ARC TUBE

(75) Inventors: Jeffrey T. Neil, North Reading, MA (US); Matthew A. Stough, Exeter, NH (US)

(73) Assignee: Osram Sylvania Inc., Danvers, MA (US)

( * ) Notice: Subject to any disclaimer, the term of this patent is extended or adjusted under 35 U.S.C. 154(b) by 145 days.

(21) Appl. No.: 10/674,774

(22) Filed: Sep. 30, 2003

(65) Prior Publication Data

US 2004/0061443 A1 Apr. 1, 2004

Related U.S. Application Data

(62) Division of application No. 09/964,052, filed on Sep. 26, 2001, now Pat. No. 6,731,066.

(60) Provisional application No. 60/271,153, filed on Feb. 23, 2001.

(51) Int. Cl.$^7$ ............................................. C04B 33/32
(52) U.S. Cl. ...................................... 264/642; 264/674
(58) Field of Search .............................. 264/632, 642, 264/674; 313/634, 623

(56) References Cited

U.S. PATENT DOCUMENTS

| | | | | |
|---|---|---|---|---|
| 3,448,319 A | * | 6/1969 | Louden | |
| 4,160,930 A | * | 7/1979 | Driessen et al. | 313/283 |
| 4,464,603 A | * | 8/1984 | McVey | 313/624 |
| 4,713,580 A | * | 12/1987 | Schoene | 313/624 |
| 4,808,882 A | * | 2/1989 | Parker et al. | 313/625 |
| 5,424,609 A | * | 6/1995 | Geven et al. | 313/623 |
| 5,426,343 A | * | 6/1995 | Rhodes et al. | 313/623 |
| 5,455,480 A | * | 10/1995 | Bastian et al. | 313/285 |
| 5,682,082 A | * | 10/1997 | Wei et al. | 313/636 |
| 5,725,827 A | * | 3/1998 | Rhodes et al. | 264/614 |
| 5,866,982 A | * | 2/1999 | Scott et al. | 313/634 |
| 5,936,351 A | * | 8/1999 | Lang | 313/634 |
| 6,004,503 A | * | 12/1999 | Neil | 264/632 |
| 6,126,887 A | * | 10/2000 | Ward et al. | 264/608 |
| 6,274,982 B1 | * | 8/2001 | Scott et al. | 313/624 |
| 6,791,266 B2 | * | 9/2004 | Venkataramani et al. | 313/623 |

FOREIGN PATENT DOCUMENTS

EP    1006552 A1 *  6/2000    ............. H01J 9/24

* cited by examiner

Primary Examiner—Steven P. Griffin
Assistant Examiner—Carlos Lopez
(74) Attorney, Agent, or Firm—Robert F. Clark

(57) ABSTRACT

A ceramic arc tube assembly and a method for making a ceramic arc tube are described which simplify the manufacture of ceramic arc tubes by reducing the number of handling and heat treatments required to assemble arc tubes prior to the final sintering operation. In particular, the invention uses transient assembly buttons during intermediate assembly steps which are removed prior to the final sintering operation.

11 Claims, 4 Drawing Sheets

METHOD OF MAKING A CERAMIC ARC TUBE

CROSS REFERENCES TO RELATED APPLICATIONS

This application is a divisional of U.S. application Ser. No. 09/964,052, filed Sep. 26, 2001, now U.S. Pat. No. 6,731,066, which claims the benefit of U.S. Provisional Application No. 60/271,153, filed Feb. 23, 2001.

TECHNICAL FIELD

This invention relates to ceramic arc tubes and more particularly to ceramic arc tube assemblies and methods of making such assemblies.

BACKGROUND OF THE INVENTION

Over the years ceramic arc tubes composed of materials such as polycrystalline alumina have been used to contain the discharges of high-pressure sodium lamps. This has resulted in the development of a number of arc tube configurations for use in sodium lamps. For example, U.S. Pat. No. 4,766,347 describes a three-piece arc tube configuration wherein the arc tube comprises a ceramic body with tubular closure members. The closure members which receive the electrodes are sealed directly in the ends of the ceramic body. In another example, U.S. Pat. No. 5,426,343 describes a three-piece arc tube configuration wherein end-sealing buttons are used which have an extending electrode-receiving member integral therewith.

More recently, ceramic arc tubes have been employed in metal halide lamps. For example, U.S. Pat. No. 5,424,609 describes a five-piece ceramic arc tube configuration for a metal halide lamp. The five-piece arc tube includes a cylindrical body, a pair of end-sealing buttons, and a pair of capillary tubes sealed to the buttons. The manufacture of these ceramic arc tubes requires extrusion or pressing of the individual components, as well as multiple assembly and heat treatment steps. These multiple steps result in increased handling which increases the manufacturing cost.

SUMMARY OF THE INVENTION

It is an object of the invention to obviate the disadvantages of the prior art.

It is another object of the invention to provide a ceramic arc tube assembly which facilitates and simplifies the manufacturing of ceramic arc tubes.

It is another object of the invention to provide a method for making ceramic arc tubes which reduces the number of handling and firing steps in the manufacturing process.

In accordance with one object the invention, there is provided a ceramic arc tube assembly comprising a hollow body having at least one open end containing an end cap, the end cap having a capillary tube and a transient assembly button, the capillary tube extending outwardly from the hollow body and having a length inserted into the open end and forming a seal with the hollow body, the transient assembly button being fixed around the capillary tube and contacting an edge of the open end, the interaction between transient assembly button and the edge of the open end determining the length of the capillary tube inserted into the open end, and the transient assembly button being capable of removal from the capillary tube without causing damage to the arc tube assembly.

In accordance with another object of the invention, there is provided a method of making a ceramic arc tube comprising the steps of:
(a) fixing a transient assembly button around a capillary tube to form an end cap;
(b) inserting the end cap into an open end of a hollow arc tube body until the transient assembly button contacts an edge of the open end;
(c) heating the assembly to form a mechanical seal between the capillary tube and the open end of the hollow body;
(d) removing the transient assembly button without damaging the assembly; and
(e) sintering the assembly to form the ceramic arc tube.

DESCRIPTION OF PREFERRED EMBODIMENTS

Figure 1:
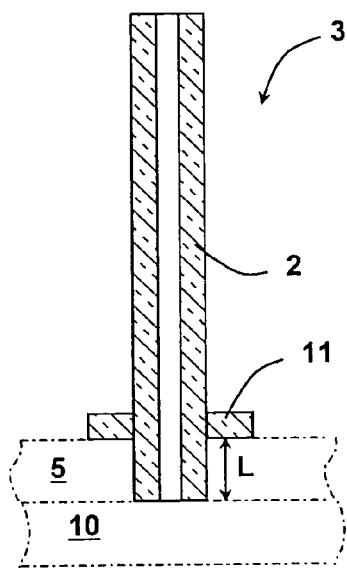
FIG. 1 is a cross-sectional view of an end cap for a three-piece ceramic arc tube assembly.

For a better understanding of the present invention, together with other and further objects, advantages and capabilities thereof, reference is made to the following disclosure and appended claims taken in conjunction with the above-described drawings.

The ceramic arc tube assembly and method of this invention simplify the manufacture of ceramic arc tubes by reducing the number of handling and heat treatments required to assemble the arc tube prior to the final sintering operation. In one embodiment, the ceramic arc tube assembly comprises a hollow arc tube body having at least one open end containing an end cap. The end cap comprises a transient assembly button and a capillary tube for receiving an electrode. The transient assembly button is fixed around the capillary tube by an initial heat treatment which causes the button to shrink and compress against the capillary tube. When the components are being assembled, the transient assembly button interacts with the edge of the open end to limit the penetration of the end cap into the arc tube body. This interaction fixes the length of the capillary tube inserted into the arc tube body. After the components are assembled, the end cap is then joined to the arc tube body in a second heat treatment step which mechanically seals the end cap to the arc tube body. The completed arc tube is then made by removing the transient assembly button and firing the assembled arc tube in a final sintering operation.

In another embodiment, the capillary tube has a radially-extending sealing member which is inserted into the open end of the arc tube body and sealed therein. The sealing member may comprise a separate part which is joined to the capillary tube along with the transient assembly button in the initial heat treatment or it may be formed as an integral part thereof. Preferably, the transient assembly button has the form of an annular disc whereby the capillary tube is inserted into the center aperture. However, other shapes may also be equally effective provided that the transient assembly button can be removed prior to the final sintering operation without damaging the arc tube assembly.

When the both ends of the arc tube require end caps to be sealed therein, the use of the transient assembly buttons is particularly advantageous as it allows both ends of the arc tube assembly to be sealed simultaneously in a vertical orientation. This simplifies the assembly process by eliminating the need to seal each end of the body portion to an end cap in two sequential heat treatment operations at two different temperatures.

The ceramic arc tube assembly of the present invention is preferably formed from polycrystalline alumina containing minor amounts of magnesia and, in some instances, yttria and zirconia. Such a material is shown in U.S. Pat. No. 5,682,082. Other minor constituents may also be included as is known in the art. In a preferred embodiment, the end caps of the arc tube assemblies (capillaries, transient assembly buttons, sealing members) are made of Baikowski grade CR-6 alumina powder containing 0.05 weight percent magnesia and the body portion of either Baikowski grade CR-6 or Baikowski grade CR-30 powder containing 0.05 weight percent magnesia. The components of the ceramic arc tube assembly may be formed by a number of conventional methods, e.g., extrusion, pressing, or injection molding.

The relative positions of the components in the arc tube assembly are fixed in a heat treatment step at or below about 1350° C. The heat treatment causes the components to densify and shrink resulting in compressive forces which fix the positions of the components. Because of the relatively low temperature of the heat treatment step, there is no cross diffusion or grain growth between the components to bond them together chemically. In addition, at temperatures below 1350° C., the transient assembly buttons retain considerable porosity which limit their strength. This allows the transient assembly buttons to be easily snapped off of the capillary tubes without damaging the arc tube assembly.

Figure 2:
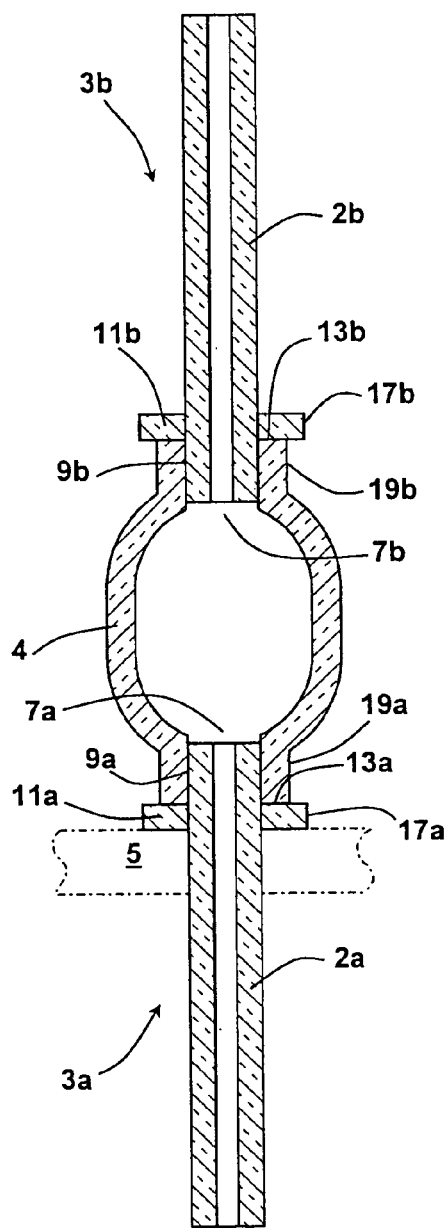
FIG. 2 is a cross-sectional view of a three-piece ceramic arc tube assembly.
Figure 3:
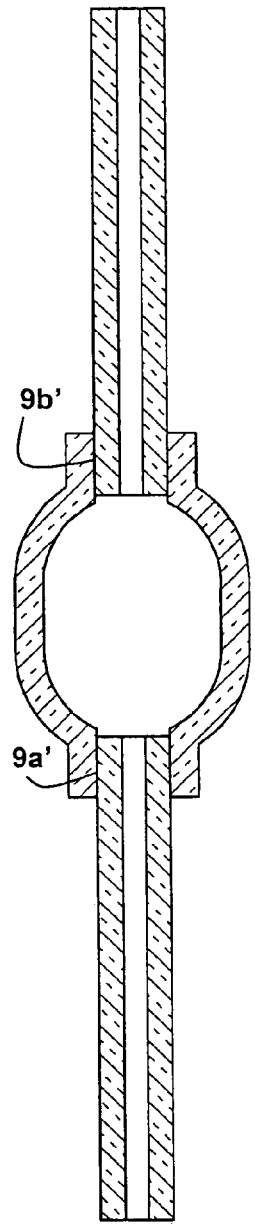
FIG. 3 is a cross-sectional view of a completed ceramic three-piece arc tube.

FIGS. 1–3 illustrate the various stages of manufacture for a three-piece ceramic arc tube using the invention described herein. In FIG. 1, an end cap 3 comprised of capillary tube 2 and transient assembly button 11 is formed by placing capillary tube 2 through a hole in perforated ceramic plate 5 (shown in dotted line) of controlled thickness L. The perforated ceramic plate 5 rests on solid ceramic plate 10 (also shown in dotted line) and prevents the capillary tube from passing completely through the perforated plate. Transient assembly button 11 is placed on the capillary tube 2 and is supported by the perforated ceramic plate 5. The plates and the supported end cap components are then placed in a furnace and heated in air at from about 1200° C. to about 1250° C. This initial heat treatment causes transient assembly button 11 to shrink and become fixed around the capillary tube. The thickness L of the perforated ceramic plate corresponds to the length of capillary tube 2 which will be inserted into the arc tube body.

In FIG. 2, an arc tube assembly is made by placing the capillary 2a of an end cap 3a through a hole in perforated ceramic plate 5 (shown in dotted line) with the protruding end of the capillary 2a extending below the plate and transient assembly button 11a supported on the plate. A hollow elliptical body portion 4 having open ends 7a, 7b is placed over the capillary portion of the end cap 3a. A second end cap 3b is inserted into the opposite end 7b of the hollow body. The periphery 17a, 17b of the transient assembly buttons 11a, 11b of each end cap 3a, 3b must be greater than the inside diameter of the open ends 7a, 7b just prior to assembly. The length of capillary tubes 2a, 2b inserted into the open ends 7a, 7b of the hollow body is determined by the interaction between the edges 13a, 13b of the open ends and the transient assembly buttons 11a, 11b. It is preferred that after assembly the periphery 17a, 17b of the transient assembly buttons 11a, 11b be greater than the periphery 19a, 19b of the open ends 7a, 7b to facilitate removal of the transient assembly buttons. Preferably, the transient assembly buttons extend about 1 mm beyond the periphery of the open ends. The assembled components are then heat treated in air at from about 1250° C. to about 1350° C. during which the body portion densifies sufficiently to shrink onto the capillary tubes forming mechanical seals 9a, 9b and a completed arc tube assembly.

The transient assembly buttons are then removed from the capillary tubes without damaging the arc tube assembly. The assembly can be fired either horizontally, or, in the preferred method, vertically in a final sintering operation at a temperature above about 1800° C. in a hydrogen-containing atmosphere. Preferably, the final sintering is performed at about 1880° C. for about 180 minutes in 100% hydrogen. The finished arc tube is shown in FIG. 3. The final sintering operation promotes grain growth and interdiffusion at the existing mechanical seals in the arc tube assembly in combination with further shrinkage. These actions cause the formation of hermetic seals 9a', 9b' in the sintered assembly which are both vacuum and gas tight.

Figures 4, 5:
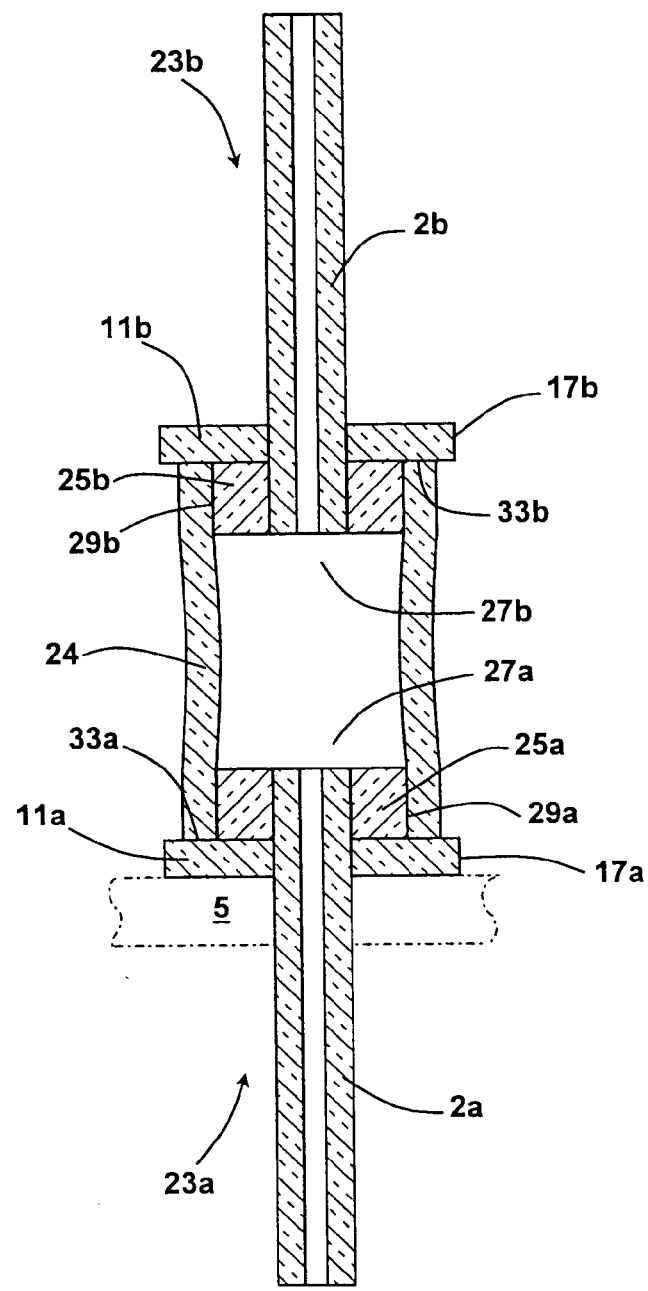
FIG. 4 is a cross-sectional view of an end cap for a five-piece ceramic arc tube assembly.
FIG. 5 is a cross-sectional view of a five-piece ceramic arc tube assembly.
Figure 6:
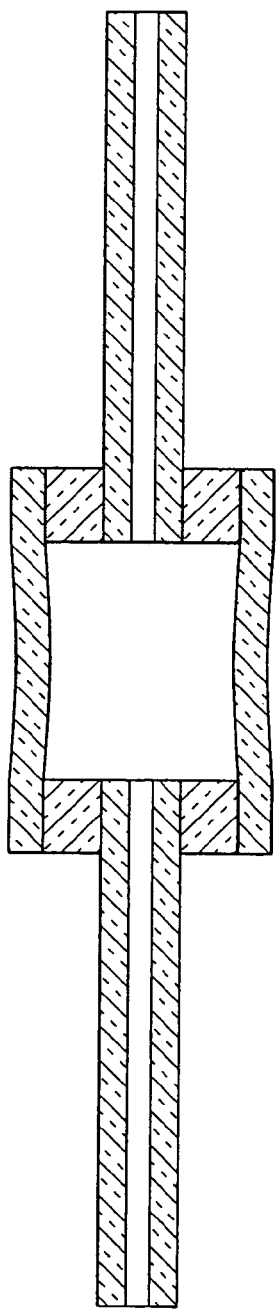
FIG. 6 is a cross-sectional view of a completed ceramic five-piece arc tube.

FIGS. 4–6 illustrate the various stages of manufacture for a five-piece ceramic arc tube using the invention described herein. In FIG. 4, the end cap 23 is shown comprised of a capillary tube 2, sealing member 25 and transient assembly button 11. The periphery 17 of transient assembly button 11 extends beyond the periphery 21 of sealing button 25. The end cap components are assembled on a ceramic plate (not shown) and heat treated in air at from about 1200° C. to about 1250° C. During this treatment, sealing member 25 and transient assembly button 11 densify sufficiently to shrink onto capillary 2 applying a compressive force which fixes the relative positions of the components.

The arc tube assembly shown in FIG. 5 is made by inserting the capillary 2a of end cap 23a through a hole in perforated ceramic plate 5 (shown in dotted line) with the protruding end of the capillary 2a extending below the plate and transient assembly button 11a supported on the plate. A cylindrical hollow arc tube body 24 having opposed open ends 27a, 27b is placed over the sealing member 25a of end cap 23a.

A second end cap 23b is inserted into the opposite open end 27b of the cylindrical body portion. The periphery 17a, 17b of transient assembly button 11a, 11b must be greater than the inside diameter of the open ends 27a, 27b of the cylindrical body just before assembly. The interaction between the transient assembly buttons 11a, 11b and the edges 33a, 33b of open ends 27a, 27b determines the insertion length of the capillary tubes 2a, 2b. It is preferred that after assembly, the periphery 17a, 17b of the transient assembly buttons 11a, 11b extend beyond the outside diameter of the open ends 27a, 27b to facilitate removal of the transient assembly buttons.

The arc tube assembly is then heat treated in air at from about 1250° C. to about 1350° C. to cause the cylindrical body to shrink onto the sealing members 25a, 25b to form mechanical seals 29a, 29b. The transient assembly buttons are then removed from the capillary tubes and the assembly is subjected to the final sintering to form a finished arc tube as shown in FIG. 6.

Figure 7:
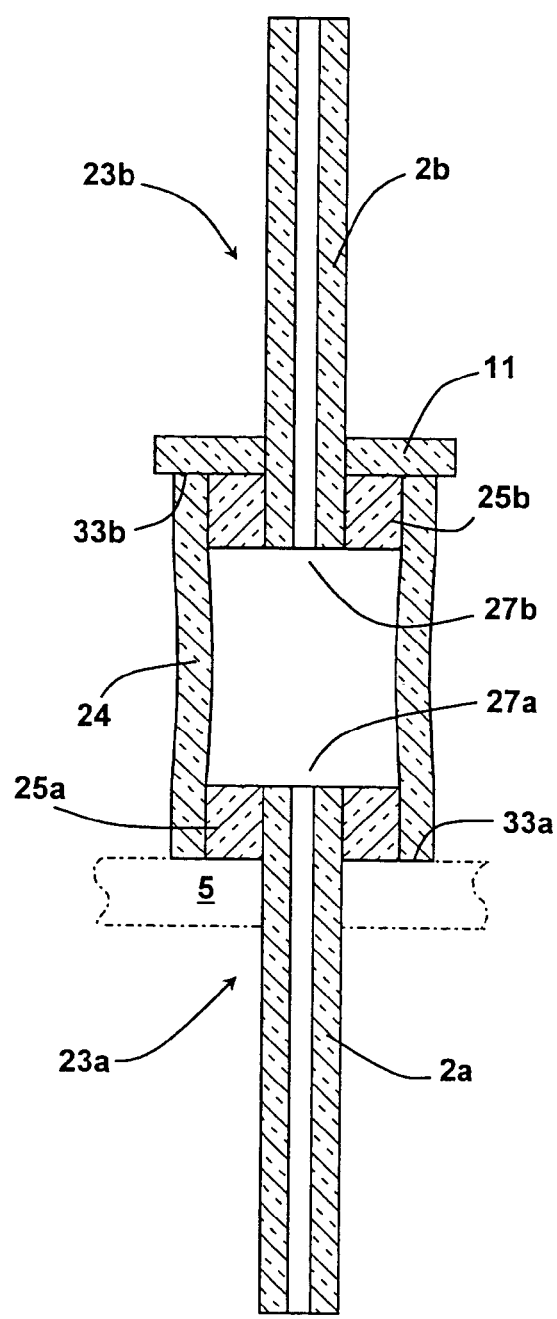
FIG. 7 is a cross-sectional view of another embodiment of a five-piece ceramic arc tube assembly.

Another embodiment of a five-piece arc tube assembly of this invention is shown in FIG. 7, this five-piece arc tube assembly is similar to the one shown in FIG. 5 except that the bottom end cap 23a is not made with a transient sealing button. The end cap 23b which utilizes transient assembly button 11 is inserted only into the upper open end 27b of the hollow body 24. The insertion length of capillary 2b is determined by the interaction between the transient assembly button 11 and edge 33b whereas the insertion length of capillary 2a is determined by the interaction between the surface of perforated plate 5 (shown in dotted line) and edge 33a. After a heat treatment to mechanically seal sealing members 25a, 25b in open ends 27a, 27b, the single transient assembly button is snapped off the upper capillary tube 2b to form a completed assembly.

In another embodiment, capillary tubes 2 may be subjected to a thermal pre-treatment prior to being joined with transient assembly buttons 11 or sealing members 25. The thermal pretreatment densifies the capillary tubes causing them to shrink so that they may fit through openings in the transient assembly buttons or sealing members. The pretreatment may be performed in air at a temperature from about 1250° C. to about 1350° C.

Figure 8:
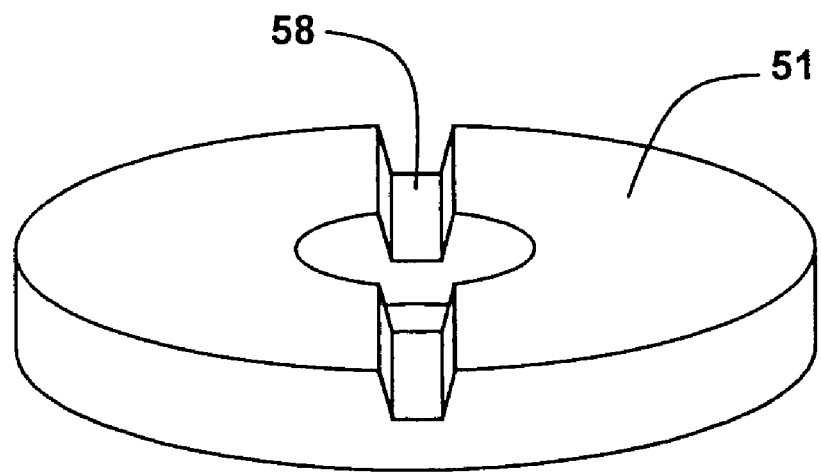
FIG. 8 is an illustration of a grooved transient assembly button.

To better facilitate removal of the transient assembly buttons, it is often desirable to incorporate a groove or notch in the buttons to reduce their strength further. The groove in the transient assembly button is typically made on one side to a depth of from about 50 percent to about 75 percent of the button thickness. The groove can be produced by a feature in the button die pressing tooling or cut by an abrasive saw. A transient assembly button comprising a grooved annular disc is shown in FIG. 8. The groove 58 is cut along a diameter of the button 51. When using grooved transient assembly buttons, it is preferred that during the end cap assembly the groove be oriented so that it will face the open end of the arc tube body when the end cap is inserted. This orientation allows the groove to be under maximum tensile stress during removal.

Figure 9:
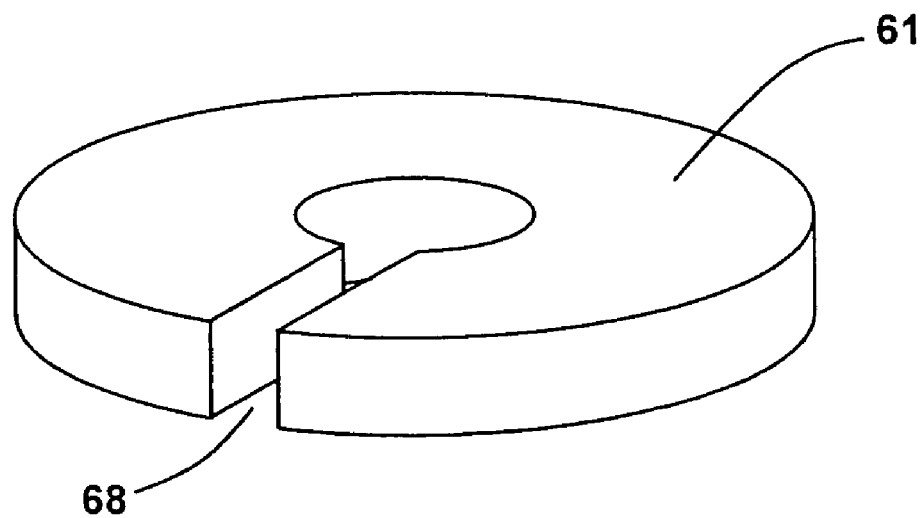
FIG. 9 is an illustration of a notched transient assembly button.

A second method to reduce the strength of the transient assembly button is to notch the button. In a preferred embodiment shown in FIG. 9, the notch 68 extends half-way through the button 61. In this case the orientation of the transient assembly button on the end cap is not important.

For thicker transient assembly buttons, grooves and notches can be utilized in various combinations to achieve an improved ease of removal.

While there has been shown and described what are at the present considered the preferred embodiments of the invention, it will be obvious to those skilled in the art that various changes and modifications may be made therein without departing from the scope of the invention as defined by the appended claims.

We claim:

1. A method of making a ceramic arc tube comprising the steps of:
    (a) fixing a transient assembly button around a capillary tube to form an end cap;
    (b) forming an arc tube assembly by inserting the end cap into an open end of a hollow arc tube body until the transient assembly button contacts an edge of the open end;
    (c) heating the arc tube assembly to form a mechanical seal between the capillary tube and the open end of the hollow body;
    (d) removing the transient assembly button without damaging the arc tube assembly; and
    (e) sintering the arc tube assembly to form the ceramic arc tube.

2. The method of claim 1 wherein the transient assembly button is fixed to the capillary tube by heating at or below about 1350° C.

3. The method of claim 1 wherein the arc tube assembly is heated at or below about 1350° C. to form the mechanical seal.

4. The method of claim 1 wherein the hollow body in step (b) has two opposed open ends having end caps inserted therein and in step (c) the capillary tube of each end cap is sealed simultaneously to the respective open end.

5. The method of claim 3 wherein the arc tube assembly is sintered at a temperature above about 1800° C. in a hydrogen-containing atmosphere.

6. A method of making a ceramic arc tube comprising the steps of:
    (a) fixing a transient assembly button and a sealing member around a capillary tube to form an end cap;
    (b) forming an arc tube assembly by inserting the sealing member of end cap into an open end of a hollow arc tube body until the transient assembly button contacts an edge of the open end;
    (c) heating the arc tube assembly to form a mechanical seal between the sealing member and the open end of the hollow body;
    (d) removing the transient assembly button without damaging the arc tube assembly; and
    (e) sintering the arc tube assembly to form the ceramic arc tube.

7. The method of claim 6 wherein the transient assembly button is fixed to the capillary tube by heating at or below about 1350° C.

8. The method of claim 7 wherein the arc tube assembly is heated at or below about 1350° C. to form the mechanical seal.

9. The method of claim 8 wherein the arc tube assembly is sintered at a temperature above about 1800° C. in a hydrogen-containing atmosphere.

10. The method of claim 1 wherein the capillary tube is subjected to a thermal pretreatment to densify the capillary tube prior to step a).

11. The method of claim 6 wherein the capillary tube is subjected to a thermal pretreatment to densify the capillary tube prior to step a).

* * * * *